(12) United States Patent
Witzig et al.

(10) Patent No.: US 9,657,721 B2
(45) Date of Patent: May 23, 2017

(54) GEARBOX UNIT WITH GEAR CARRIER

(71) Applicant: ZF Friedrichshafen AG, Friedrichshafen (DE)

(72) Inventors: Jochen Witzig, Friedrichshafen (DE); Alfred Kienzle, Frickingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 76 days.

(21) Appl. No.: 14/427,051

(22) PCT Filed: Aug. 5, 2013

(86) PCT No.: PCT/EP2013/066357
§ 371 (c)(1),
(2) Date: Mar. 10, 2015

(87) PCT Pub. No.: WO2014/048625
PCT Pub. Date: Apr. 3, 2014

(65) Prior Publication Data
US 2015/0240790 A1    Aug. 27, 2015

(30) Foreign Application Priority Data

Sep. 27, 2012  (DE) .......................... 10 2012 217 509

(51) Int. Cl.
*F16H 3/62* (2006.01)
*F16H 3/44* (2006.01)
(Continued)

(52) U.S. Cl.
CPC .............. *F03D 11/02* (2013.01); *F03D 15/00* (2016.05); *F03D 80/70* (2016.05); *F16H 1/46* (2013.01);
(Continued)

(58) Field of Classification Search
CPC ................. F16H 2200/201; F16H 3/64; F05B 2260/40311; F03D 15/00
See application file for complete search history.

(56) References Cited

U.S. PATENT DOCUMENTS 5,039,305 A * 8/1991 Pierce .................... B60K 17/06
                                                      475/200
5,222,923 A * 6/1993 Hotta ...................... F16H 3/666
                                                      475/276
(Continued)

FOREIGN PATENT DOCUMENTS

DE          103 14 757 B3    11/2004
DE      10 2008 011 386 B3    3/2009
(Continued)

OTHER PUBLICATIONS

"Verzahnungsberechnung fur Windkraftgetriebe, ein Prozess", Mar. 13, 2012, Kiss Soft Calculation Programs for Machine Design.
(Continued)

*Primary Examiner* — Tisha Lewis
(74) *Attorney, Agent, or Firm* — Michael J. Bujold; Davis & Bujold, P.L.L.C.

(57) ABSTRACT

A transmission unit (1), particularly for a wind power plant, which has a first planetary stage (2), on the drive input side, a second planetary stage (3) and a third planetary stage (4), on the drive output side, which are coupled with one another in such a manner that a torque from the drive input side can be divided between the first and the second planetary stages (2; 3) and recombined in the third planetary stage (4). The first, the second and the third planetary stages (2; 3; 4) have a common gearwheel carrier (20) which is mounted for rotation about a rotational axis of the transmission unit (1).

18 Claims, 1 Drawing Sheet

(51) Int. Cl.
*F16H 37/06* (2006.01)
*F03D 11/02* (2006.01)
*F16H 1/46* (2006.01)
*F16H 37/08* (2006.01)
*F16H 57/08* (2006.01)
*F03D 80/70* (2016.01)
*F03D 15/00* (2016.01)

(52) U.S. Cl.
CPC ....... *F16H 37/0833* (2013.01); *F16H 57/082* (2013.01); *F05B 2260/40311* (2013.01); *Y02E 10/722* (2013.01)

(56) References Cited

U.S. PATENT DOCUMENTS

| | | | | |
|---|---|---|---|---|
| 5,460,579 A * | 10/1995 | Kappel | ............ | F16H 3/66 475/276 |
| 6,607,464 B1 | 8/2003 | Bauer et al. | | |
| 7,828,686 B2 * | 11/2010 | Aiyakkannu | ............ | F03D 1/00 475/221 |
| 7,914,411 B2 | 3/2011 | Basteck | | |
| 8,298,113 B2 | 10/2012 | Giger | | |
| 2010/0207396 A1 * | 8/2010 | Simon | ............ | H02P 9/06 290/55 |
| 2013/0270837 A1 * | 10/2013 | Mongeau | ............ | F03D 1/001 290/1 C |
| 2014/0203561 A1 * | 7/2014 | Minadeo | ............ | F03D 11/02 290/44 |
| 2015/0094186 A1 * | 4/2015 | Bang | ............ | F16H 3/44 475/280 |
| 2015/0099603 A1 * | 4/2015 | Goleski | ............ | F16H 3/62 475/275 |
| 2015/0126324 A1 * | 5/2015 | Beck | ............ | F16H 3/66 475/275 |

FOREIGN PATENT DOCUMENTS

| | | |
|---|---|---|
| EP | 1 240 443 B1 | 4/2003 |
| EP | 1 398 531 A2 | 3/2004 |
| WO | 2008/104258 A1 | 9/2008 |

OTHER PUBLICATIONS

German Search Report Corresponding to 10 2012 217 509.1 mailed Feb. 26, 2013.
International Search Report Corresponding to PCT/EP2013/066357 mailed Oct. 30, 2013.
Written Opinion Corresponding to PCT/EP2013/066357 mailed Oct. 30, 2013.

* cited by examiner

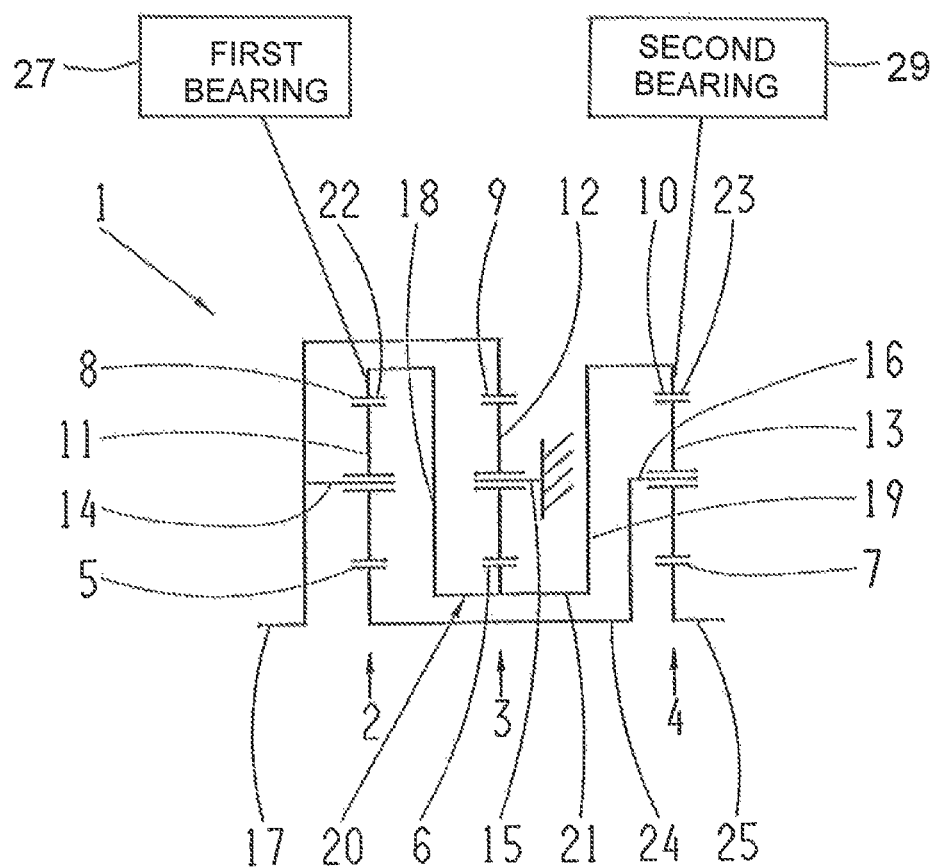

GEARBOX UNIT WITH GEAR CARRIER

This application is a National Stage completion of PCT/EP2013/066357 filed Aug. 5, 2013, which claims priority from German patent application serial no. 10 2012 217 509.1 filed Sep. 27, 2012.

FIELD OF THE INVENTION

The present invention concerns a transmission.

BACKGROUND OF THE INVENTION

Particularly in wind power plants, transmissions are used for transforming the torque and rotational speed between the transmission input and transmission output shafts, In this context a high torque applied to the transmission input shaft with a low rotational speed is converted to a lower torque applied to the transmission output shaft with a higher rotational speed. Basically, these transmissions can be divided into transmission types that comprise either planetary stages connected in series one behind another or planetary stages that are connected in parallel. The latter category includes the so-termed differential transmission which as a rule consists of three planetary stages. By virtue of suitable coupling of the first two planetary stages, a suitable torque distribution between the two planetary stages can be obtained. The summation in the third planetary stage allows the power to be recombined and correspondingly, along with that, a large transmission ratio range to be obtained.

A transmission of this type for wind power plants is known from EP 1 240 443 B1. It consists of a symmetrically configured planetary stage on the drive input side, downstream from which is connected at least one transmission stage, wherein the planetary stage consists of at least two equally dimensioned, power-dividing planetary gear systems connected in parallel. Downstream from the power-dividing planetary gear systems is connected a load-equalizing differential transmission stage. The differential transmission stage is designed as a passive differential in the form of an equalizing planetary gear system. It affects uniform power branching to the two connected sun shafts of the planetary stages that consist of the planetary gear systems. In this case one sun shaft is functionally connected to the sun gear and the other sun shaft to the ring gear of the differential transmission stage, whereas the planetary carrier of the differential transmission stage forms the drive output. Alternatively, the differential transmission stage is designed as an active differential in the form of an axially soft-mounted equalizing spur gear pair with opposite helical gearing. On the one hand this produces a uniform power distribution between the two connected sun shafts of the planetary stages consisting of the planetary gear systems, and on the other hand it is involved as a transmission stage in the overall transmission ratio of the transmission. In this case one sun shaft is functionally connected to one of the equalizing spur gears of the equalizing spur gear pair and the other sun shaft is functionally connected to the other equalizing spur gear.

Furthermore, WO 2008/104258 A1 describes a transmission for a wind power plant, which comprises a rotor shaft having, in an inside space, a first planetary stage and a second planetary stage of a planetary gear system. Relative to a longitudinal axis, the first planetary stage and the second planetary stage are arranged in series. The rotor shaft is coupled in a rotationally fixed manner to the planetary carrier of the first planetary stage and to the ring gear of the second planetary stage. The planetary gearwheels of the second planetary stage are fixed to the housing. A ring gear of the first planetary stage and a sun gear of the second planetary stage form a unit that rotates as one piece. Radially inside, a torque support piece a third planetary stage is integrated in an aperture located radially around the longitudinal axis. Third planetary gearwheels are mounted on a radially outward-facing connection ring of an inner coupling shaft, on third planetary carrier bolts positioned there. A central shaft serves as the third sun gear. The third planetary stage transmits the overall power with a very high rotational speed.

SUMMARY OF THE INVENTION

A purpose of the present invention is to provide a transmission that can be used in many ways.

The objective addressed by the invention is achieved by the characteristics described below. Other advantageous design features emerge from the drawing.

A transmission unit, particularly one for a wind power plant is proposed, which comprises a first planetary stage on the drive input side, a second planetary stage, and a third planetary stage on the drive output side. Preferably, in the longitudinal direction the second planetary stage is arranged between the first planetary stage on the drive input side and the third planetary stage on the drive output side. The three planetary stages are coupled with one another in such manner that drive torque from the drive input side can be divided between the first and second planetary stages and can be recombined in the third planetary stage. Thus, depending on the chosen tooth number ratios either a high transmission ratio, or an equalized torque distribution between the first and second planetary stages can be produced. By virtue of the division of the drive input torque the first and second planetary stages can be made more compact since they have to withstand a lower torque, so that the overall size of the transmission unit is reduced. The three planetary stages have a common gearwheel carrier. This is designed to be mounted so that it rotates about a rotational axis of the transmission unit. Thus a transmission unit can be provided, which enables both the division of an input torque between more than one planetary stage and which at the same time has a high transmission ratio and restricted dimensions. Such a gearwheel carrier can even be a shaft which is connected rotationally fixed to at least two elements.

It is advantageous if the gearwheel carrier forms or comprises a sun gear, a ring gear or a planetary carrier of the planetary stage concerned. Thus, by simply designed means a coupling of the three planetary stages can be realized in the smallest possible fitting space. Preferably, to form at least one of the ring gears the gearwheel carrier has inner teeth and/or to form the sun gear it has outer teeth. In this way the gearwheel carrier can be produced very inexpensively.

An essentially uniform distribution of the drive input side torque between the first and second planetary stages at the same time as a high transmission ratio can be ensured if the second planetary stage is coupled by means of the gearwheel carrier to the first and third planetary stages in such manner that a partial torque that can be introduced into the second planetary stage can be divided between the first and third planetary stages. Furthermore, in this way a transmission unit which takes up very little fitting space can be produced.

It is advantageous for the gearwheel carrier to couple the sun gear of the second planetary stage, the ring gear of the first planetary stage and the ring gear of the third planetary stage to one another in a rotationally fixed manner. In that way the partial torque introduced into the second planetary stage can be transmitted with an elevated rotational speed to the central sun gear of the second planetary stage and then, in turn, by virtue of the rotationally fixed coupling by means of the gearwheel carrier, preferably in equal parts to the two ring gears respectively of the first and third planetary stages. This results in a very space-saving design of the transmission unit. A planetary stage is understood to mean a device comprising at least a sun gear, a ring gear and a planetary carrier, wherein on the planetary carrier at least one rotatable planetary gearwheel is mounted, which meshes with the sun gear and the ring gear. When they are mounted rotatably, the sun gear, the ring gear and the planetary carrier have the same rotational axis.

The production costs of the transmission unit can in particular be reduced if the gearwheel carrier is made integrally, as one piece. Preferably, in such a case the gearwheel carrier is a cast component. Alternatively, however, the gearwheel carrier can also consist of more than one part, in particular two or three components, which facilitates the assembly and dismantling of the planetary stages. The individual components of the gearwheel carrier are preferably connected to one another in a material-merged, interlocking and/or friction-force locked manner. To ensure a coupling of the individual components of the gearwheel carrier that can be taken apart, it is advantageous for them to be connected to one another by fastening means, in particular screws, bolts and/or rivets.

It is also advantageous for the gearwheel carrier to have only two bearings. This can reduce the axial space taken up by the transmission unit. Furthermore, the production costs of the transmission unit are reduced since expensive bearings are saved. Preferably, the first of the two bearings is arranged in the area of an end closer to the first planetary stage and the second bearing is arranged in the area of an end closer to the third planetary stage. In this way there is no need for costly bearings in the connection area between two individual components of the gearwheel carrier. This makes the transmission unit more compact in the axial direction. Moreover it can be made more easily and more robust, since additional bearings which are prone to defects and are also expensive, are saved.

In an advantageous further development of the invention the gearwheel carrier is in the form of a hollow shaft. This enables the sun gear of the first planetary stage, in the form of a solid shaft, to extend at least partially into the hollow shaft, whereby the volume occupied by the transmission unit is reduced. Preferably, in the area of its two ends the gearwheel carrier has inner teeth in each case, which form the ring gears of the first and third planetary stages respectively. This enables the transmission unit to be more simply designed. The structural volume of the transmission unit is also reduced.

It is advantageous for the torque on the drive input side to be divided between the planetary carrier of the first planetary stage and the ring gear of the second planetary stage. This enables the transmission unit to be made very compact, since the first and second planetary stages each have to withstand a lower torque.

To be able to produce as high as possible a rotational speed, it is advantageous for the sun gear of the first planetary stage to be coupled to the planetary carrier of the third planetary stage. This enables the rotational speed of the sun gear of the third planetary stage, which in particular forms the drive output shaft, to be increased substantially, whereby in turn the efficiency of the wind power plant for which it is provided can be increased.

It is also advantageous for the third planetary stage, in particular by way of its sun gear, to be coupled with a spur gear stage. This can result in an additional increase of the nominal rotational speed. The spur gear stage can be designed in such manner that the transmission unit can be used for high-speed applications in wind energy plants. In that case the generator provided for this is operated with a nominal rotational speed of around 1550 r/min. Alternatively, however, the spur gear stage can also be designed for medium-speed applications, in which a larger generator with a substantially lower rotational speed of around 450 r/min is used. The advantages of compact structural form, robustness and, at the same time, high transmission ratio possibilities are fully retained with either of these embodiments.

BRIEF DESCRIPTION OF THE DRAWINGS

Below, the invention is explained in more detail with reference to a one drawing. The lone drawings shows a schematic half-representation of a transmission unit with three planetary stages, which are coupled by means of a common, rotatably mounted gearwheel carrier.

DETAILED DESCRIPTION OF THE
PREFERRED EMBODIMENTS

FIG. 1 shows a transmission unit 1 which comprises three planetary stages 2, 3 and 4. The first planetary stage 2 is arranged in the transmission unit 1 on the drive input side and the third planetary stage 4 on the drive output side. The second planetary stage 3 is formed in an area between these two planetary stages 2, 4. The planetary stages 2, 3, 4 each have a central sun gear 5, 6, 7, a ring gear 8, 9, 10 surrounding these and a radial distance away from them, and in the area between these two, planetary gearwheels 11, 12, 13 which are mounted rotatably. In each of the planetary stages 2, 3, 4 the planetary gearwheels 11, 12, 13 are held and/or guided in the circumferential direction of the transmission unit 1 by a respective planetary carrier 14, 15, 16. The first, second and third planetary stages 2, 3.4 are coupled with one another in such manner that torque from the drive input side can be divided between the first and second planetary stages 2, 3 and recombined in the third planetary stage 4. For this, the transmission unit 1 has a driveshaft 17 on its drive input side. This is coupled in a rotationally fixed manner with the planetary carrier 14 of the first planetary stage 2 and with the second ring gear 9 of the second planetary stage 3. Thus, the torque from the drive input side is divided between the first planetary carrier 14 and the second ring gear 9 in such manner that a partial torque is applied to each of these two, which torque is lower compared with the initial torque from the drive input side. Consequently, the first and second planetary stages 2, 3 can be made more compact since each of them has to withstand a lower torque.

The second planetary carrier 15 of the second planetary stage 3 is designed to be fixed. For that, it is connected to a housing (not shown here) of the transmission unit 1 or made integrally therewith. The second sun gear 6 of the second planetary stage 3 has a first coupling 18 to the first planetary stage 2 and a second coupling 19 to the third planetary stage 4. The partial torque that can be introduced into the second planetary stage 3 is in this way additionally divided between the first and third planetary stages 2, 4. In the present case the first and second couplings 18, 19 are made in the form of a gearwheel carrier 20. The gearwheel carrier 20 comprises, respectively, a sun gear, a planetary carrier and/or a ring gear of the three planetary stages 2, 3, 4. In this example embodiment, the gearwheel carrier 20 forms the second sun gear 6 of the second planetary stage 3, the first ring gear 8 of the first planetary stage 2 and the third ring gear 10 of the third planetary stage 4. Thereby, the first ring gear 8, the second sun gear 6 and the third ring gear 10 form a unit coupled to one another in a rotationally fixed manner. The gearwheel carrier 20 is mounted to rotate, so that the first ring gear 8, the second sun gear 6 and the third ring gear 10 can rotate together about a longitudinal axis of the transmission unit 1.

The gearwheel carrier 20 can be made integrally, as one piece, or of more than one component. In an integral version of the gearwheel carrier 20, it is preferably in the form of a casting. Alternatively, if the gearwheel carrier 20 has more than one component, then preferably the first ring gear 8 and the first coupling 18 form a first part of the gearwheel carrier 20 and the third ring gear 10 with the second coupling 19 form a second part of the gearwheel carrier 20. The second sun gear 6 can form the third part of the gearwheel carrier 20, or alternatively it can be combined with one of the other two parts. However any other grouping can also be considered, which in particular is appropriate for facilitating the assembly or dismantling of the transmission unit 1.

According to FIG. 1, the gearwheel carrier 20 is in the form of a hollow shaft 21. In the area of its first end 22 associated with the first planetary stage 2 and in the area of its second end 23 associated with the third planetary stage 4, the gearwheel carrier 20 has in each case internal teeth forming the first ring gear 8 and the third ring gear 10, respectively. In the area between the first and second ends 22, 23 the gearwheel carrier 20 has external teeth, forming the second sun gear 6 of the second planetary stage 3. Preferably, the gearwheel carrier 20 has only two bearings 27, 29. The two bearings 27, 29 are in each case arranged in the area of one of the two ends 22, 23 of the gearwheel carrier 20. Particularly in the area of the third planetary stage 4 this enables defect-prone and expensive bearings of the second sun gear 6 to be saved. Consequently, the transmission unit 1 is easier to make and, besides, is less prone to failure.

The first sun gear 5 of the first planetary stage 2 is coupled in a rotationally fixed manner to the third planetary carrier 16 of the third planetary stage 4. For this, the first sun gear 5 is in the form of a solid shaft 24 that extends through the gearwheel carrier 20 formed as a hollow shaft 21. This enables a particularly space-saving and simply designed form of the transmission unit 1 to be made. The third sun gear 7 of the third planetary stage 4 is coupled on the drive output side to a drive output shaft 25, or alternatively it is made as such.

With the transmission unit 1 shown in FIG. 1, the performance and transmission ratio requirements of modern wind power plants can be met. Furthermore, by virtue of the present coupling concept, an essentially balanced distribution of the drive input side torque between the first and second planetary stages 2, 3 can be produced.

When the transmission unit is operated, the drive-side torque is introduced into the transmission unit 1 by way of a driveshaft 17 and, due to the rotationally fixed coupling of the driveshaft 17 to the first planetary carrier 14 and the second ring gear 9, the torque is divided between the first and second planetary stages 2, 3. The second ring gear 9 of the second planetary stage 3, which is set into rotation thereby, drives the second planetary gear 12 which is fixed in the circumferential direction of the transmission unit 1. In turn, this meshes with the second sun gear 6, so that the latter is moved in a rotational direction opposite to that of the driveshaft 17. By virtue of the first and second couplings 18, 19, the first ring gear 8 of the first planetary stage 2, the second sun gear 6 of the second planetary stage 3 and the third ring gear 10 of the third planetary stage 4 rotate in a manner rotationally fixed with one another and in a rotational direction opposite to that of the driveshaft 17. Thus, part of the partial torque introduced into the second planetary stage 3 is transmitted back by way of the first coupling 18 or the common gearwheel carrier 20 to the first planetary stage 2. Since the first planetary carrier 14 and the first ring gear 8 rotate in opposite directions, the rotational speed of the first planetary gearwheel 11 and the first sun gear 5 that meshes with it is increased. Accordingly, the first sun gear 5 rotates at a higher speed in the same direction as the driveshaft 17.

Thus, the gearwheel carrier 20 and the first sun gear 5 rotate in opposite directions to one another. Due to the coupling with the third planetary carrier 16, the solid shaft 24 transmits to the third planetary stage 4 rotational movement corresponding to the rotational direction of the driveshaft 17 but at a higher rotational speed and with a lower torque. In addition, by way of the second coupling 19, the second planetary stage 3 transmits to the third planetary stage 4 in the area of the third ring gear 10, rotational movement opposite to that of the driveshaft 17 but at a higher rotational speed and with a lower torque. Due to the opposite rotations of the third planetary carrier 16 and the third ring gear 10, the rotational speed of the third planetary wheel 13 and that of the third sun gear 7 meshing with it are additionally increased. The torque converted in that manner is passed on out of the transmission unit 1 by way of the drive output shaft 25. Thus, the third planetary stage 4 acts as a differential transmission stage which again recombines the two partial torques that were divided between the first and second planetary stages 2, 3. Accordingly, the transmission unit 1 enables very high drive-side torque to be divided between several planetary stages, at the same time as having a high transmission ratio and while occupying the least possible structural space.

In addition, the transmission unit 1 can comprise a spur gear stage (not shown here) which is coupled to the drive output shaft 25. This enables the transmission unit 1 to be used for so-termed high-speed applications in wind power plants. In such a case, a connected generator with a nominal rotational speed of around 1550 r/min is operated. Alternatively, the transmission unit 1 can also be used for medium-speed applications, in which a larger generator with a substantially lower generator rotational speed of around 450 r/min is used. With both variants the aforesaid advantages are obtained in full.

The present invention is not limited to the example embodiments illustrated and described. Adaptations within the scope of the claims are also possible, such as a combination of characteristics, even if these are shown and described in relation to different example embodiments.

INDEXES

1 Transmission unit
2 First planetary stage
3 Second planetary stage
4 Third planetary stage
5 First sun gear
6 Second sun gear 7 Third sun gear
8 First ring gear
9 Second ring gear
10 Third ring gear
11 First planetary gearwheel
12 Second planetary gearwheel
13 Third planetary gearwheel
14 First planetary carrier
15 Second planetary carrier
16 Third planetary carrier
17 Driveshaft
18 First coupling
19 Second coupling
20 Gearwheel carrier
21 Hollow shaft
22 First end
23 Second end
24 Solid shaft
25 Drive output shaft

The invention claimed is:

1. A transmission unit (1) comprising:
a first planetary stage (2) on a drive input side,
a second planetary stage (3),
a third planetary stage (4) on a drive output side,
a drive input shaft is continuously directly connected to the first planetary stage and to the second planetary stage, the first, the second and the third planetary stages (2; 3; 4) being coupled with one another in such a manner that torque from the drive input shaft is continuously divided between the first and the second planetary stages (2; 3) and recombined in the third planetary stage (4),
the first, the second and the third planetary stages (2; 3; 4) having a common gearwheel carrier (20) which is mounted to rotate about a rotational axis of the transmission unit (1), and
the second planetary stage (3) is coupled by the common gearwheel carrier (20) with the first and the third planetary stages (2; 4) such that partial torque, that is introduced into the second planetary stage (3), is divided between the first and the third planetary stages (2; 4).

2. The transmission unit according to claim 1, wherein the common gearwheel carrier (20) is connected in a rotationally fixed manner to one of a sun gear, a ring gear and a planetary carrier of the first planetary stage, the common gearwheel carrier is connected in a rotationally fixed manner to one of a sun gear, a ring gear and a planetary carrier of the second planetary stage, and the common gearwheel carrier is connected in a rotationally fixed manner to one of a sun gear, a ring gear and a planetary carrier of the third planetary stage.

3. The transmission unit according to claim 1, wherein the common gearwheel carrier (20) couples the sun gear (5) of the second planetary stage (3), the ring gear (8) of the first planetary stage (2) and the ring gear (10) of the third planetary stage (4) to one another in a rotationally fixed manner.

4. The transmission unit according to claim 1, wherein the common gearwheel carrier (20) is integrally made as one piece.

5. The transmission unit according to claim 1, wherein the gearwheel carrier (20) has only first and second bearings and the first bearing is arranged in an area of an end (22) of the common gearwheel carrier (20), adjacent to the first planetary stage (2), whereas the second bearing is arranged in an area of an end (23) of the common gearwheel carrier (20) adjacent to the third planetary stage (4).

6. The transmission unit according to claim 1, wherein the common gearwheel carrier (20) is a hollow shaft (21), into which the sun gear (5) of the first planetary stage (2), which is a solid shaft (24), extends at least partially.

7. The transmission unit according to claim 1, wherein the torque from the drive input side is divided between the planetary carrier (14) of the first planetary stage (2) and the ring gear (9) of the second planetary stage (3).

8. The transmission unit according to claim 1, wherein the sun gear (5) of the first planetary stage (2) is coupled to the planetary carrier (16) of the third planetary stage (4).

9. The transmission unit according to claim 1, wherein the planetary carrier (15) of the second planetary stage (3) is designed to be stationary.

10. The transmission unit according to claim 1, wherein the third planetary stage (4) is coupled to a spur gear stage by way of the sun gear (7) of the third planetary stage (4).

11. A transmission unit for a wind power plant, the transmission unit comprising:
first, second and third planetary gear stages, each of the first the second and the third planetary gear stages having a sun gear, a ring gear and a planetary carrier, a driveshaft being continuously connected to one of the sun gear, the ring gear and the planetary carrier of the first planetary gear stage and to one of the sun gear, the ring gear and the planetary carrier of the second planetary gear stage;
the first planetary gear stage being arranged on a drive input side of the transmission unit, the third planetary gear stage being arranged on a drive output side of the transmission unit, and the second planetary gear stage being arranged between the first and the third planetary gear stages;
the first, the second and the third planetary gear stages being coupled with one another such that torque from the driveshaft of the transmission unit is divided between the first and the second planetary stages and recombined in the third planetary stage (4); and
the first, the second and the third planetary gear stages have a common gearwheel carrier which is mounted for rotation about a rotational axis of the transmission unit.

12. The transmission unit according to claim 11, wherein the common gearwheel carrier couples the sun gear of the second planetary gear stage and the ring gears of both the first and the third planetary gear stages together in a rotationally fixed manner.

13. The transmission unit according to claim 11, wherein the second planetary gear stage is coupled, via the common gearwheel carrier (20), with the first and the third planetary gear stages such that a partial torque, that is introduced into the second planetary gear stage, is dividable between the first and the third planetary gear stages.

14. The transmission unit according to claim 11, wherein the common gearwheel carrier is integrally made as one piece.

15. The transmission unit according to claim 11, wherein the common gearwheel carrier is rotationally supported by first and second bearings, the first bearing is arranged in an area of an end of the common gearwheel carrier adjacent to the first planetary gear stage and the second bearing is arranged in an area of an end of the common gearwheel carrier adjacent to the third planetary gear stage.

16. The transmission unit according to claim 11, wherein the common gearwheel carrier is a hollow shaft and the sun gear of the first planetary gear stage is a solid shaft that coaxially extends at least partially through the hollow shaft.

17. The transmission unit according to claim 11, wherein the torque from the driveshaft is divided between the planetary carrier of the first planetary gear stage and the ring gear of the second planetary gear stage;
- the sun gear of the first planetary gear stage is coupled to the planetary carrier of the third planetary gear stage so as to prevent relative rotation therebetween;
- the planetary carrier of the second planetary gear stage is rotationally fixed to a housing of the transmission unit; and
- the sun gear of the third planetary gear set forms a drive output of the transmission unit.

18. A transmission unit for a wind power plant, the transmission unit comprising:
- a drive input shaft and a drive output shaft;
- first, second and third planetary gear stages, each of the first, the second and the third planetary gear stages comprises a sun gear, a ring gear and a planet carrier, and the first, the second and the third planetary gear stages are sequentially arranged, between the drive input and the drive output shafts, in an order of the first planetary gear stage, the second planetary gear stage and the third planetary gear stage;
- the drive input shaft, the planet carrier of the first planetary gear stage and the ring gear of the second planetary gear stage are connected to one another so as to prevent relative rotation therebetween;
- the sun gear of the first planetary gear stage and the planet carrier of the third planetary gear stage are connected to one another;
- the ring gear of the first planetary gear stage, the sun gear of the second planetary gear stage and the ring gear of the third planetary gear stage are connected to one another so as to prevent relative rotation therebetween;
- the planet carrier of the second planetary gear stage is connected to a housing of the transmission unit so as to prevent relative rotation therebetween; and
- the sun gear of the third planetary gear stage is connected to the output shaft.

* * * * *